US012805640B2

(12) United States Patent
Redburn

(10) Patent No.: US 12,805,640 B2
(45) Date of Patent: Nov. 24, 2026

(54) HUNTING STAND ACCESSORY HOLDER AND METHOD OF USE THEREOF

(71) Applicant: Keith Redburn, Bay City, MI (US)

(72) Inventor: Keith Redburn, Bay City, MI (US)

( * ) Notice: Subject to any disclaimer, the term of this patent is extended or adjusted under 35 U.S.C. 154(b) by 92 days.

(21) Appl. No.: 19/053,320

(22) Filed: Feb. 13, 2025

(65) Prior Publication Data

US 2025/0255413 A1 Aug. 14, 2025

Related U.S. Application Data

(60) Provisional application No. 63/552,992, filed on Feb. 13, 2024.

(51) Int. Cl.
*A47C 7/68* (2006.01)
*A01M 31/02* (2006.01)

(52) U.S. Cl.
CPC ............. *A47C 7/705* (2018.08); *A01M 31/02* (2013.01)

(58) Field of Classification Search
CPC ........ A47C 7/705; A01M 31/02; A47B 13/14; A47B 13/16; A47B 23/02
See application file for complete search history.

(56) References Cited

U.S. PATENT DOCUMENTS 215,380 A * 5/1879 Lyford ................... A47B 13/16 108/97
422,080 A * 2/1890 Hutton ..................... A47C 7/70 297/170
2,710,051 A * 6/1955 Greenberg ............... A47C 7/70 297/170
3,567,284 A * 3/1971 Miller et al. ............. A47C 7/70 297/160
3,610,429 A * 10/1971 MacKay ................ A47B 13/14 211/126.15
4,410,158 A * 10/1983 Maffei ............... F16M 11/2014 248/214
4,526,419 A * 7/1985 Bowman .................. A61G 5/10 224/407
5,044,590 A * 9/1991 Carafice ................. F16M 11/10 248/309.1
5,941,484 A * 8/1999 Stepney, III .......... F41B 5/1453 7/138
6,016,891 A * 1/2000 Sava .................. A62B 35/0068 182/136
6,017,085 A * 1/2000 LaCroix ................... A47C 7/70 297/173
7,681,850 B2 3/2010 Johnson
(Continued)

*Primary Examiner* — Hanh V Tran
(74) *Attorney, Agent, or Firm* — Poznak Dyer Kanar Schefsky Thompson PLC; Robert C. Corbett

(57) ABSTRACT

A tray system for use by hunters includes a tray and a clamp. The clamp defines a channel into which a frame member on a hunting stand is insertable to attach the clamp to the hunting stand. The clamp also defines a groove and a tray support portion. A flange on the tray is insertable into the groove, and the tray support portion is positioned to support the tray when the flange is in the groove. The tray system enables a hunter to quickly install a tray to support hunting accessories in close proximity to an occupant of the stand. The tray system may also include a mobile telephone holder attachable to the tray to support a mobile telephone in a generally vertical position so that the screen of the telephone is readily viewable by the hunter.

5 Claims, 6 Drawing Sheets

(56) References Cited

U.S. PATENT DOCUMENTS

| | | | | |
|---|---|---|---|---|
| 8,025,015 | B1 * | 9/2011 | Kennedy, Sr. | B60R 11/0252<br>248/562 |
| 12,557,905 | B2 * | 2/2026 | Martinez | A47B 23/001 |
| 2004/0216953 | A1 | 11/2004 | Cheeks | |
| 2007/0089931 | A1 * | 4/2007 | Hunt | A01M 31/02<br>182/129 |
| 2008/0073946 | A1 * | 3/2008 | Maione | A47C 7/705<br>297/161 |
| 2015/0115114 | A1 * | 4/2015 | White | F41A 23/18<br>248/201 |
| 2020/0077639 | A1 * | 3/2020 | Blaha | A01M 31/02 |

* cited by examiner

FIG. 9
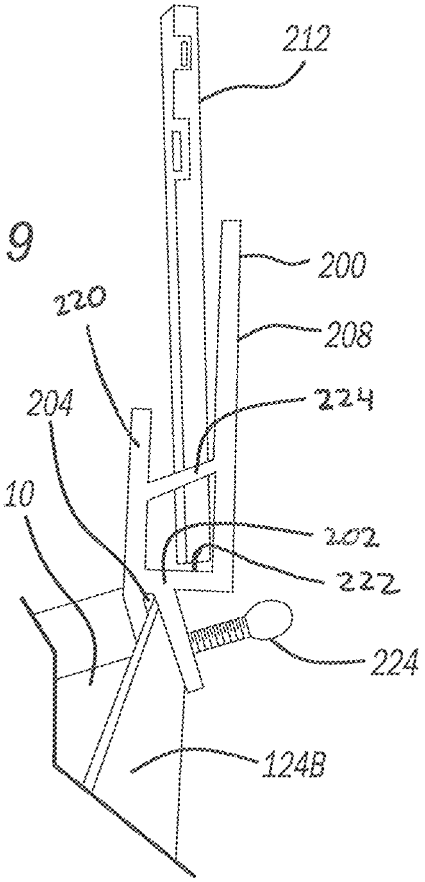
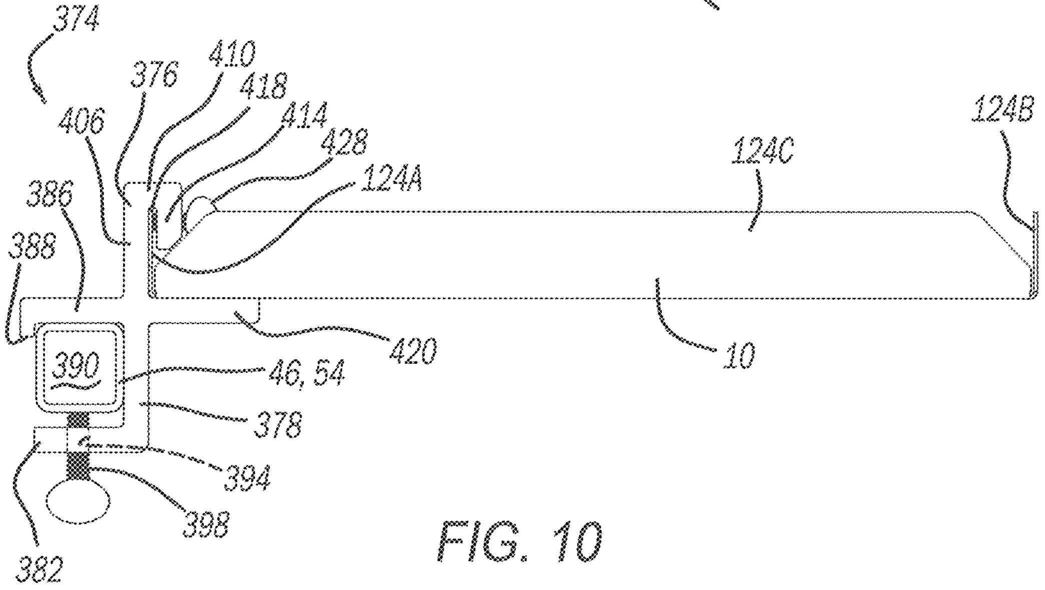
FIG. 10

HUNTING STAND ACCESSORY HOLDER AND METHOD OF USE THEREOF

CROSS-REFERENCE TO RELATED APPLICATION

This application claims the benefit of U.S. Provisional Patent Application No. 63/552,992, filed Feb. 13, 2023, and which is hereby incorporated by reference in its entirety.

TECHNICAL FIELD

This disclosure relates to trays for holding accessories during various outdoor sports such as hunting.

BACKGROUND

Hunters often hunt from an elevated position above the ground, which reduces the likelihood that they will be detected by game animals while also providing the hunter with an enhanced field of view for spotting and shooting game animals. Some hunters may use a tree stand having a seat and a foot platform mounted to a tree in an elevated position. Often, the seat and platform are connected to a ladder so that a hunter can climb to the seat.

Hunters may also employ elevated blinds or stands that are supported by poles, and which may be enclosed. While in a stand or blind, a hunter may employ various accessories including, but not limited to, a cell phone or electronic tablet, binoculars, a game call, etc.

SUMMARY

A tray system for use by hunters includes a tray and a clamp. The clamp defines a channel into which a frame member on a hunting stand is insertable to attach the clamp to the hunting stand. The clamp also defines a groove and a tray support portion. A flange on the tray is insertable into the groove, and the tray support portion is positioned to support the tray when the flange is in the groove. The tray system enables a hunter to quickly install a tray to support hunting accessories in close proximity to an occupant of the stand. The tray system may also include a mobile telephone holder attachable to the tray to support a mobile telephone in a generally vertical position so that the screen of the telephone is readily viewable by the hunter.

The above features and advantages and other features and advantages of the present disclosure are readily apparent from the following detailed description of the best modes for carrying out the disclosure when taken in connection with the accompanying drawings.

BRIEF DESCRIPTION OF THE DRAWINGS

FIG. 9 is a schematic, cross-sectional side view of a mobile phone holder installed on the tray; and FIG. 10 is a schematic, front view of the tray attached to the tree stand assembly with an alternative mounting clamp assembly.

DESCRIPTION OF THE PREFERRED EMBODIMENTS

Figure 1:
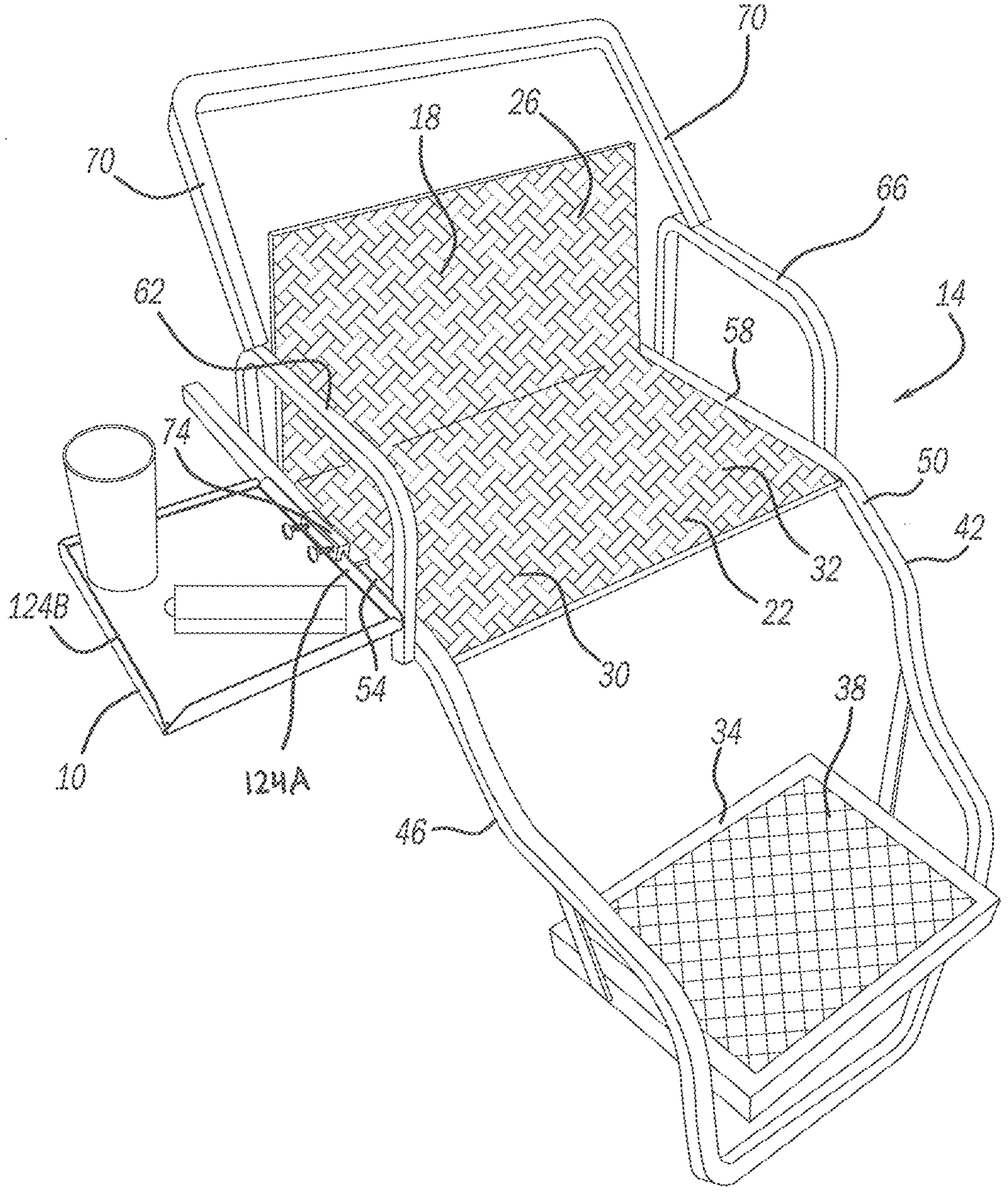
FIG. 1 is a schematic, perspective view of a tree stand assembly with a tray attached thereto.
Figure 2:
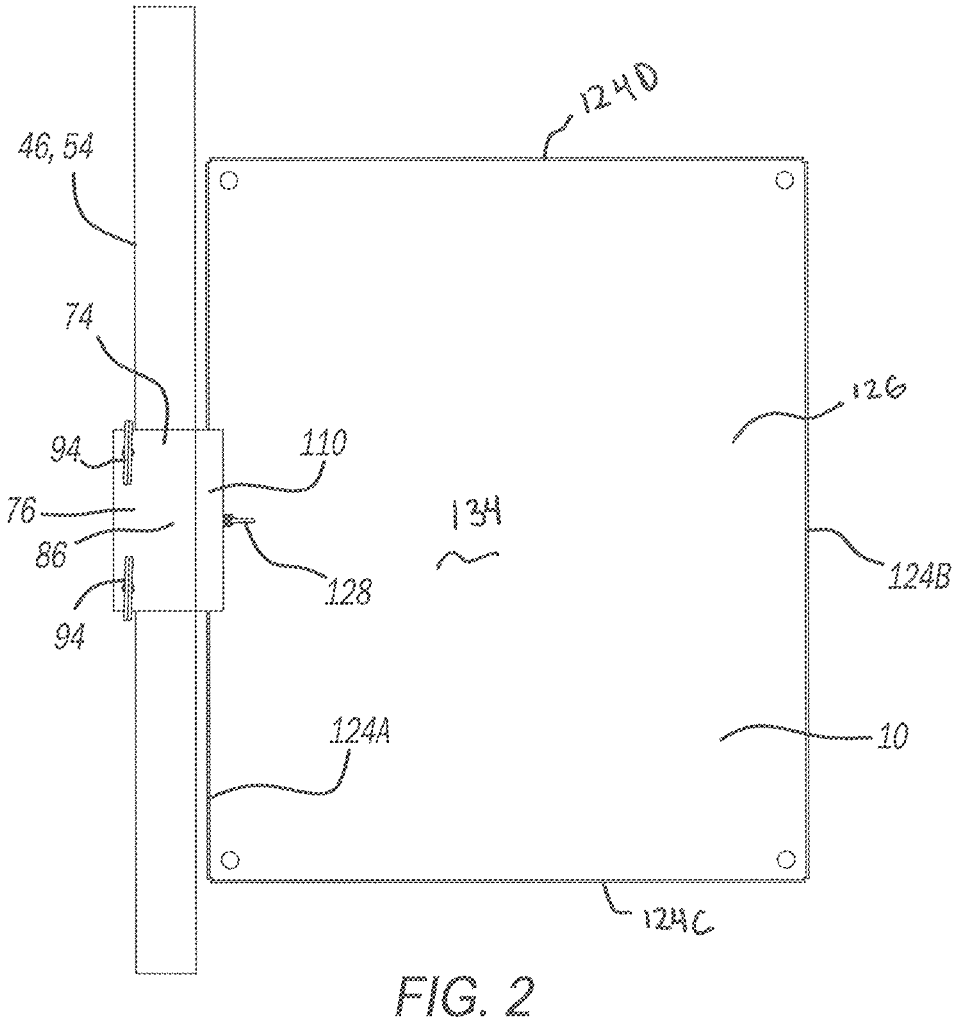
FIG. 2 is a schematic, top view of the tray and a mounting clamp assembly that interconnects the tray and the tree stand assembly.

Referring to the Figures, wherein like reference numbers refer to like components throughout, a tray 10 for attachment to a tree stand assembly 14 is schematically depicted. The tree stand assembly 14 includes a seat 18 for supporting a hunter. In the embodiment depicted, the seat 18 includes a flexible member 22 having a seatback portion 26 and a seat portion 30. The seat 18 is positioned such that, when the tree stand assembly 14 is mounted to a tree, the seatback portion 26 is generally vertical to support the back of the hunter, and the seat portion 30 is generally horizontal with an upwardly-facing surface 32 on which the hunter sits.

The flexible member 22 may, for example, be fabric or mesh. In other embodiments, and within the scope of the claimed invention, the seat 18 may comprise multiple members that cooperate to define a seat portion and seatback portion. Furthermore, and within the scope of the claimed invention, the seat portion and/or seatback portion may be comprised of rigid members, such as expanded metal.

The tree stand assembly 14 also includes foot rest platform 34 that, when the tree stand assembly is mounted to a tree, is generally horizontally oriented and provides an upwardly-facing surface 38 positioned below the seat portion 30; as understood by those skilled in the art, the upwardly-facing surface 38 is positioned to support the feet of the hunter when the hunter is occupying the seat 18.

A frame 42 interconnects the seat 18, and the platform 38. The frame 42 in the embodiment depicted includes tubes 46, 50. Tube 46 includes a first segment 54 that is substantially linear and horizontal when the tree stand assembly 14 is mounted to the tree. Tube 50 includes a second segment 58 that is parallel to the first segment 54. In the embodiment depicted, the seat portion 30 extends between, and is supported by, the segments 54, 58. In the embodiment depicted, the tree stand assembly 14 includes armrests 62, 66 that are attached to respective segments 54, 58, and a safety rail 70 that is pivotably attached to armrests 62, 66.

The tray 10 is mounted to segment 54 with a clamp assembly 74. The clamp assembly 74 includes an extruded member 76 having a first segment 78, a second segment 82, and a third segment 86. The extruded member 76 has substantially the same cross-sectional shape (shown in FIG. 3) in any plane taken along its length. The second segment 82 extends from, and is perpendicular to, the first segment 78. The third segment 86 extends from, and is perpendicular to, the first segment 78. The third segment 86 is also parallel to the second segment 82 such that the first segment 78, the second segment 82, and the third segment 86 cooperate to define a U-shaped channel 90.

Segment 54 of tube 46 extends into channel 90 and is retained therein by two pull pins 94. More specifically, segment 86 defines two holes 98 and segment 82 defines two holes 102. With the segment 54 of tube 46 extending through the channel 90, each pin 94 extends through one of holes 98 and one of holes 102 to prevent removal of the segment 54 from the channel 90. More specifically, the tube 46 is captured between segments 78, 82, 86 and the pins 94. Thus, interaction between the tube 46 and segments 82 and 86 prevent the clamp assembly 74 from moving vertically relative to the tube 46. Interaction between the tube 46 and segment 78 and the pins 94 prevents the clamp assembly 74 from moving laterally relative to the tube 46.

The member 76 also includes a fourth segment 106 that is coplanar with segment 78, a fifth segment 110 that extends from, and is perpendicular to, segment 106, and a sixth segment 114 that extends from, and is perpendicular to, segment 110. Segment 114 is parallel to segment 106. Accordingly, segments 106, 110, 114 cooperate to define another channel or groove 118. The member also defines a seventh segment 120 that is coplanar with segment 86.

Figure 3:
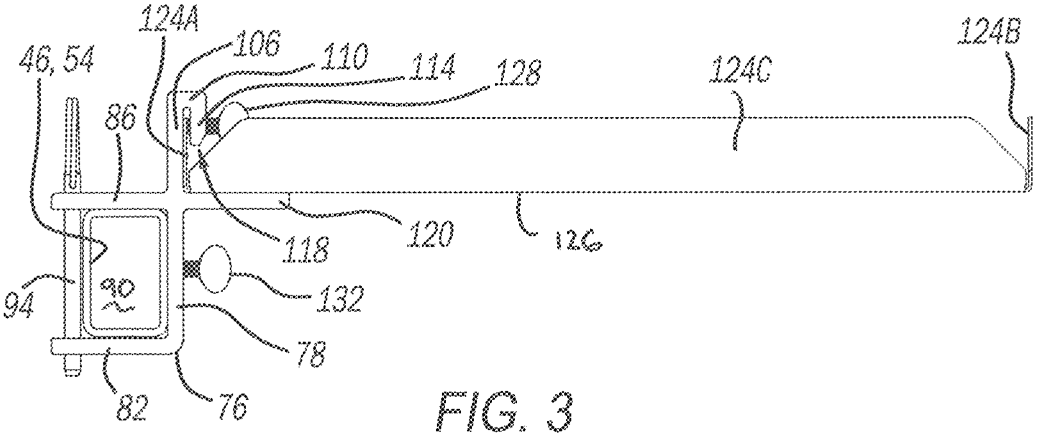
FIG. 3 is a schematic, front view of the tray and the mounting clamp assembly.
Figure 4:
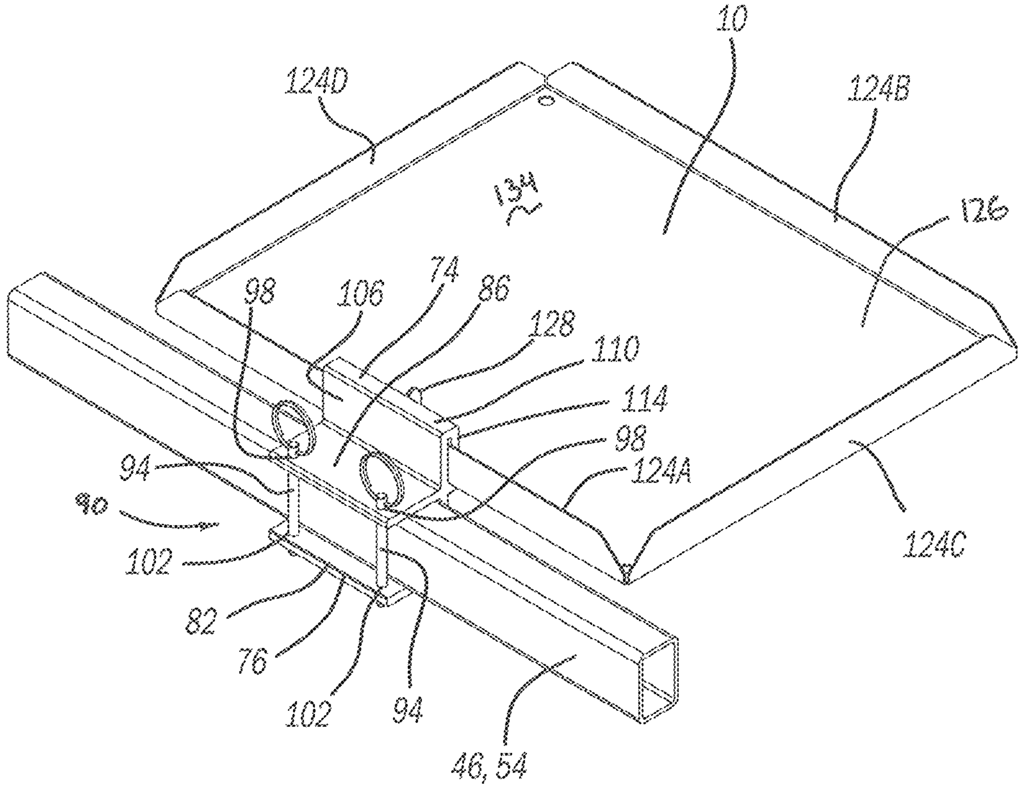
FIG. 4 is a schematic, perspective view of the tray and the mounting clamp assembly.
Figure 5:
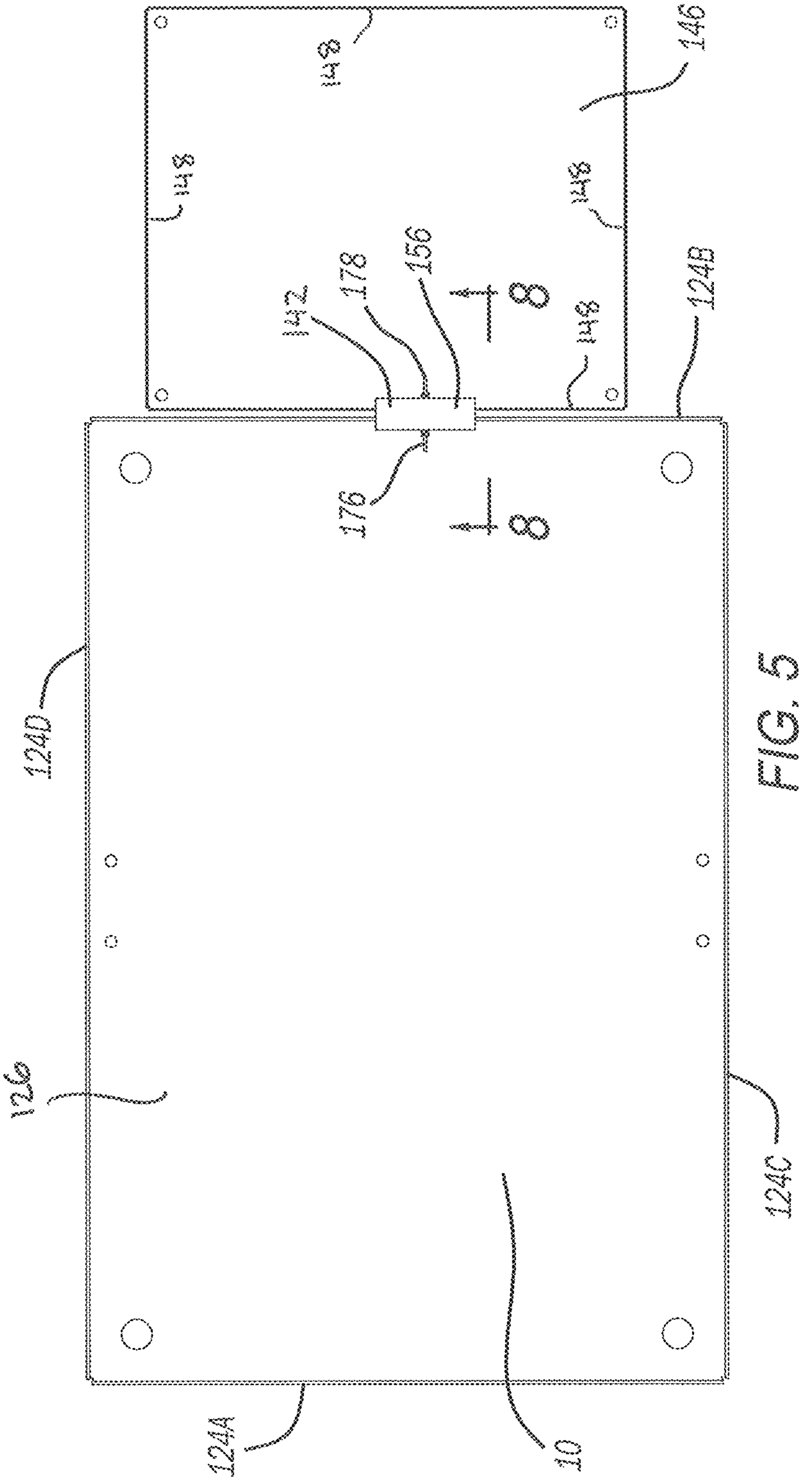
FIG. 5 is a schematic, top view of the tray of FIGS. 1-4 with a tray extension mounted thereto via yet another clamp assembly.
Figure 6:
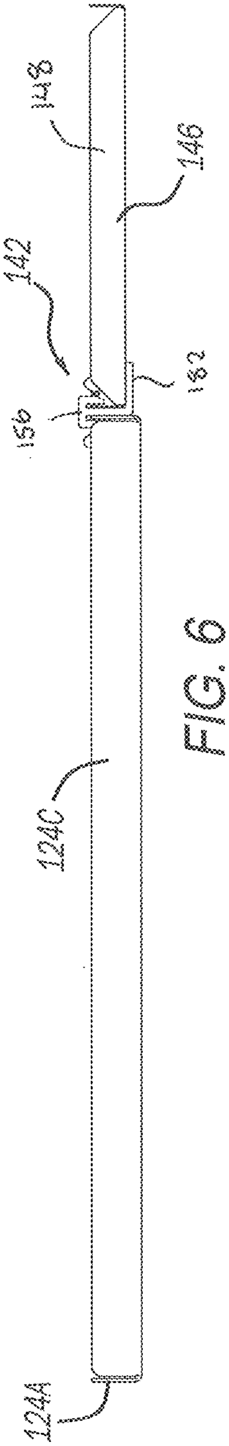
FIG. 6 is a schematic, front view of the tray and tray extension.
Figure 7:
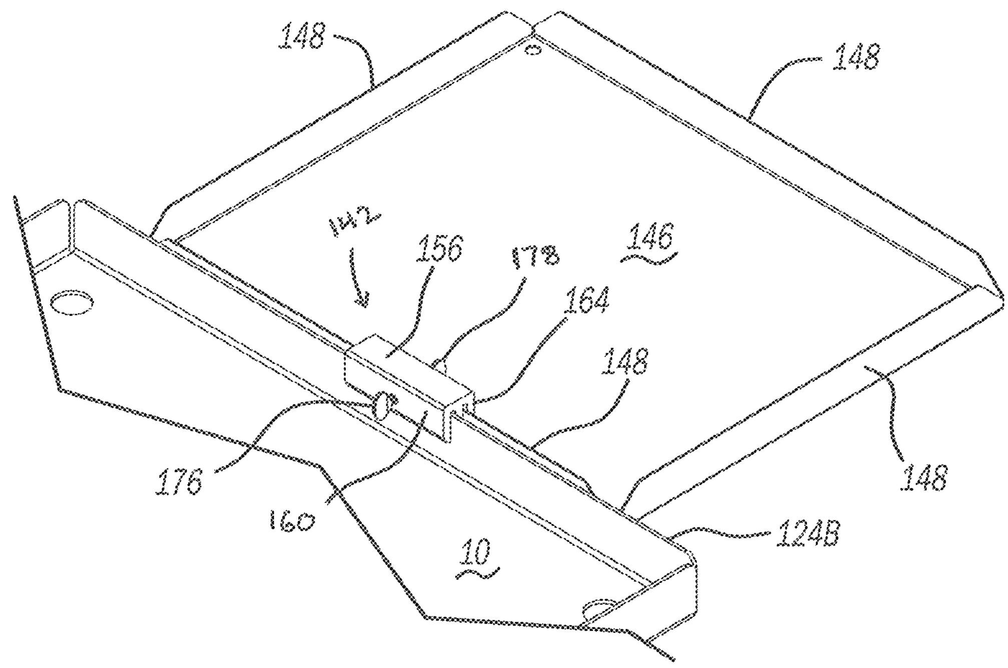
FIG. 7 is a schematic, perspective view of the tray and tray extension.

The tray 10 includes a plurality of flanges 124A, 124B, 124C, 124D that extend upwardly from respective edges of the tray 10. One of the flanges 124A extends into the groove 118 while the base 126 of the tray 10 rests on segment 120, as shown in FIG. 3. A thumb screw 128 extends through segment 114 and into the groove 118 to selectively press against the flange 124A and assist in retaining the flange 124A within the groove 118. Similarly, a thumb screw 132 extends through segment 78 and into channel 90 to selectively press against segment 54 and press segment 54 against the pins 94. As understood by those skilled in the art, the thumb screws 128 are selectively rotatable by a user to vary the compressive force exerted by the thumb screws 128 on the flange 124A or the segment 54.

A method of attaching the tray 10 to the tree stand assembly 14 includes positioning the member 76 of the clamp assembly 74 such that the segment 54 is within the channel 90, and then inserting pins 94 through holes 98, 102, as shown in the Figures. The method may also include rotating the thumb screw 132 that extends through segment 78 so that the thumb screw 132 and the pins 94 exerts a compressive load on the segment 54, thereby minimizing relative movement of the member 76 relative to the tube 46.

The method also includes inserting the flange 124A of the tray 10 into the groove 118 such that the base 126 of the tray 10 rests on segment 120, as shown in the drawings. The method may also include rotating the thumb screw 128 so that the thumb screw 128 and the segment 106 exert a compressive load on the flange 124A, thereby securing the tray 10 to the clamp assembly 74 and the tube 46 of the tree stand assembly 14.

The tray 10 is positioned laterally with respect to the seat 18, and thus the tray 10 provides a support for various objects and accessories that may be desired by a hunter, as shown in FIG. 1. For example, FIG. 1 shows a beverage container, binoculars, and a game call positioned on the tray 10. More specifically, the base 126 defines a substantially planar surface 134 that faces upward when the tray 10 is attached to the tree stand assembly 14 as shown. The surface 134 supports any accessories that a user may want to retain in close proximity when the user occupies the seat 18, and the flanges 124A-D prevent the accessories from sliding off the surface 134. The clamp assembly 74 provides a secure attachment of the tray 10 to the tree stand assembly 14 and is easily and quickly installed.

FIGS. 5-8 depict yet another clamp assembly 142 that connects an extension tray 146 to tray 10. Tray 146 includes flanges 148 that extend around its periphery. Clamp 142 includes segments 152 and 156. Segment 156 is connected to, and perpendicular to segment 152. Segment 160 extends perpendicularly from one end of segment 156, and segment 164 extends perpendicularly from the other end of segment 156. Segments 152, 156, and 160 cooperate to define a first groove or channel 168, and segments 152, 156, and 164 cooperate to define a second groove or channel 172.

Figure 8:
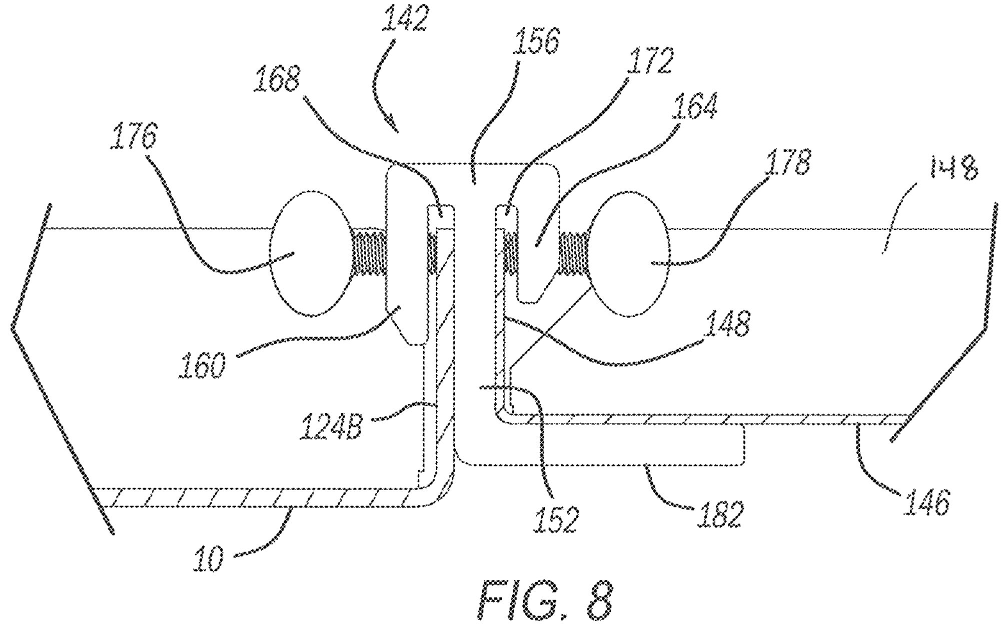
FIG. 8 is a schematic, cross-sectional front view of the tray extension clamp assembly interconnecting the tray and the tray extension.

Flange 124B of tray 10 is inserted into the channel 168 and tightened by thumb screw 176, which extends through segment 160. Flange 148 of tray 146 extends into channel 172 and tightened by thumb screw 178, which extends through segment 164. Segment 182 of clamp 142 extends perpendicularly from segment 152 and is positioned to support the base of tray 146 as shown in FIG. 8. The clamp assembly 142 enables a user to quickly and easily increase the surface area for supporting accessories by enabling an additional tray 146 to be attached to tray 10.

FIG. 9 schematically depicts a mobile phone holder 200 that is attachable to the tray 10. The mobile phone holder 200 securely supports a mobile telephone or other electronic device in an orientation such that the screen of the device is generally vertical and therefore readily viewable by an occupant of the seat 18. Referring to FIG. 9, the mobile phone holder 200 includes a base 202 that defines a groove 204 for receiving one of the flanges of the tray 10, such as flange 124B. A phone support portion 208 extends generally upwardly from base 202. A front support portion 220, which is shorter than portion 208, extends from the base 216 substantially parallel to portion 208. Side reinforcements 224 may interconnect portions 208 and 220. The upper surface 222 of the base 202 cooperates with portions 208 and 220 to define a channel into which a mobile telephone 212 or other device is insertable.

The surface 222 off the base 202 supports the mobile telephone 212, which will lean against portion 208. Portion 220 prevents the mobile telephone 212 from sliding off of the base surface 222. To use the mobile phone holder 200, the holder 200 is positioned relative to the tray 10 so that one of the flanges 124B extends into the groove 204. A thumb screw 224 extends though a hole in the base 202 and into the groove 204. The thumb screw is rotatable to selectively press against the flange 124B within the groove 204 to secure the flange 124B within the groove 204. The mobile telephone is then placed on surface 222 and leans against portion 208.

FIG. 10 schematically depicts an alternative clamp assembly 374 that may be used to connect the tray 10 to the segment 54 of frame member 46 in place of clamp assembly 74. Referring to FIG. 10, wherein like reference numbers refer to like components from FIGS. 1-9, the clamp assembly 374 includes an extruded member 376 having a first segment 378, a second segment 382, and a third segment 386. The second segment 382 extends from, and is perpendicular to, the first segment 378. The third segment 386 extends from, and is perpendicular to, the first segment 378. The third segment 386 is also parallel to the second segment 382 such that the first segment 378, the second segment 382, and the third segment 386 cooperate to define a channel 390.

Segment 54 of tube 46 extends into channel 390. More specifically, a lip 388 descends perpendicularly from segment 386; lip 388 also cooperates with segments 378, 382, and 386 to define channel 390. Segment 382 defines two holes (only one of which is shown at 394), each having a respective thumb screw (only one of which is shown at 398) extending therethough and into the channel 390. By turning the thumb screws 398, the thumbscrews urge the segment 54 of tube 46 against segment 386 to retain the segment 54 within the channel 390. Lip 388 also prevents removal of the tube 46 from the channel 390 by physical part interference, as shown in FIG. 10.

The member 376 also includes a fourth segment 406 that is coplanar with segment 378, a fifth segment 410 that extends from, and is perpendicular to, segment 406, and a sixth segment 414 that extends from, and is perpendicular to, segment 410. Segment 414 is parallel to segment 406. Accordingly, segments 406, 410, 414 cooperate to define another channel or groove 418. The member also defines a seventh segment 420 that is coplanar with segment 386.

The tray 10 includes a plurality of flanges 124A, 124B, 124C, 124D that extend upwardly from respective edges of the tray 10. One of the flanges 124A extends into the groove 418 while the base of the tray 10 rests on segment 420, as shown in FIG. 3. A thumb screw 428 extends through a hole in segment 414 and into the groove 418 to selectively press against the flange 124A and assist in retaining the flange 124A within the groove 118

While the best modes for carrying out the invention have been described in detail, those familiar with the art to which this invention relates will recognize various alternative designs and embodiments for practicing the invention within the scope of the appended claims.

The invention claimed is:

1. A tray system for attachment to a hunting stand having a frame with a tube, the tray system comprising:

a tray having a base defining a substantially planar surface and a flange extending from the substantially planar surface;

a clamp assembly including a clamp member having a first segment, a second segment, a third segment, a fourth segment, a fifth segment, a sixth segment, and a seventh segment;

wherein the second segment extends from, and is perpendicular to, the first segment;

wherein the third segment extends from, and is perpendicular to, the first segment and is also parallel to the second segment such that the first segment, the second segment, and the third segment cooperate to define a channel having a size and shape sufficient for the tube to extend through the channel;

wherein the fourth segment is coplanar with the first segment;

wherein the fifth segment extends from, and is perpendicular to, the fourth segment;

wherein the sixth segment extends from, and is perpendicular to, the fifth segment, and is parallel to the fourth segment such that the fourth, fifth, and sixth segments cooperate to define a groove;

wherein the seventh segment is coplanar with the third segment; and wherein the flange of the tray is insertable into the groove such that the base of the tray contacts the seventh segment.

2. The tray system of claim 1, wherein the clamp assembly includes a first screw extending through one of the segments and into the groove, said first screw being selectively rotatable to exert a compressive force on the flange within the groove.

3. The tray system of claim 2, wherein the clamp assembly includes a second screw extending through one of the segments and into the channel, said second screw being selectively rotatable to exert a compressive force on the tube within the channel.

4. The tray system of claim 3, further comprising a mobile telephone holder having a base defining a slot, a first portion extending from the base, and a second portion extending from the base;

wherein the mobile telephone holder is positionable such that the flange extends into the slot.

5. The tray system of claim 4, further comprising a third screw extending through the base and into the slot, said third screw being selectively rotatable to exert a compressive force on the flange within the slot.

* * * * *